US011206125B2

(12) United States Patent
Petkov et al.

(10) Patent No.: US 11,206,125 B2
(45) Date of Patent: Dec. 21, 2021

(54) METHOD FOR DISTRIBUTING DATA, A COMMUNICATION SYSTEM AND A METERING UNIT

(71) Applicant: Diehl Metering Systems GmbH, Nuremberg (DE)

(72) Inventors: Hristo Petkov, Nuremberg (DE); Thomas Lautenbacher, Erlangen (DE); Thomas Kauppert, Nuremberg (DE); Klaus Gottschalk, Winkelhaid (DE)

(73) Assignee: Diehl Metering Systems GmbH, Nuremberg (DE)

( * ) Notice: Subject to any disclaimer, the term of this patent is extended or adjusted under 35 U.S.C. 154(b) by 0 days.

(21) Appl. No.: 16/720,922

(22) Filed: Dec. 19, 2019

(65) Prior Publication Data

US 2020/0127807 A1    Apr. 23, 2020

Related U.S. Application Data

(63) Continuation of application No. PCT/EP2018/000304, filed on Jun. 11, 2018.

(30) Foreign Application Priority Data

Jul. 20, 2017    (DE) .............................. 102017006898
Oct. 14, 2017    (DE) ............................. 102017009564

(51) Int. Cl.
*H04L 7/04*     (2006.01)
*H04B 17/309*   (2015.01)
(Continued)

(52) U.S. Cl.
CPC .............. *H04L 7/04* (2013.01); *G01D 4/002* (2013.01); *G01D 4/02* (2013.01); *H04B 17/309* (2015.01);
(Continued)

(58) Field of Classification Search
CPC ......... H04L 7/04; H04L 5/0048; H04L 12/18; H04L 67/10; H04B 17/309; G01D 4/002; G01D 4/02
See application file for complete search history.

(56) References Cited

U.S. PATENT DOCUMENTS 7,830,874 B2 * 11/2010 Cornwall ............... G01D 4/004
                                                            370/389
9,134,348 B2 *  9/2015 Shamir ................. G01R 21/006
(Continued)

FOREIGN PATENT DOCUMENTS

EP      2848005 B1    6/2016
WO   2016175905 A1   11/2016

OTHER PUBLICATIONS

Gerhard Lindner, "Sensors and actuators based on surface acoustic waves propagating along solid-liquid interfaces", Online at stacks.jop.org/JPhysD/41/123002, Published: May 30, 2008, pp. 1/13.

*Primary Examiner* — Chandrahas B Patel
(74) *Attorney, Agent, or Firm* — Laurence A. Greenberg; Werner H. Stemer; Ralph E. Locher

(57) ABSTRACT

A method distributes data in a communication system which has a group of metering units arranged in each case to measure the consumption of a delivered supply medium, and a data collector. Each metering unit has a communication module, a frequency reference device, and a processor to operate the metering unit on the basis of the data. The metering units and the data collector are arranged in a communication network, wherein the data are transmitted by the data collector via the communication system within a session, common to the group of metering unit. A synchronization sequence common to the metering units is transmitted within the common session and the synchronization sequence is dimensioned in such a way that the frequency reference device of each metering unit in the group of
(Continued)

metering units is synchronized with the transmitted synchronization sequence within a session.

25 Claims, 7 Drawing Sheets

(51) Int. Cl.
*G01D 4/00* (2006.01)
*G01D 4/02* (2006.01)
*H04L 5/00* (2006.01)
*H04L 12/18* (2006.01)
*H04L 29/08* (2006.01)
*H04L 29/06* (2006.01)

(52) U.S. Cl.
CPC ............ *H04L 5/0048* (2013.01); *H04L 12/18* (2013.01); *H04L 67/10* (2013.01); *H04L 67/12* (2013.01); *H04L 69/22* (2013.01)

(56) References Cited

U.S. PATENT DOCUMENTS

| | | | |
|---|---|---|---|
| 9,568,507 B2* | 2/2017 | Perry | G01R 21/133 |
| 9,648,400 B2 | 5/2017 | Hald et al. | |
| 9,772,363 B2* | 9/2017 | Canne | H04B 17/00 |
| 10,263,504 B2* | 4/2019 | Moore | G06F 11/1471 |
| 10,764,879 B2* | 9/2020 | Bendlin | H04W 72/042 |
| 2005/0025187 A1* | 2/2005 | Li | H04L 49/3009 |
| | | | 370/476 |
| 2008/0068217 A1 | 3/2008 | Van Wyk et al. | |
| 2008/0259844 A1 | 10/2008 | Richeson et al. | |
| 2015/0121359 A1 | 4/2015 | Osterloh et al. | |
| 2015/0318943 A1 | 11/2015 | Zhu et al. | |

* cited by examiner

METHOD FOR DISTRIBUTING DATA, A COMMUNICATION SYSTEM AND A METERING UNIT

CROSS-REFERENCE TO RELATED APPLICATION

This is a continuation application, under 35 U.S.C. § 120, of copending international application No. PCT/EP2018/000304, filed Jun. 11, 2018, which designated the United States; this application also claims the priority, under 35 U.S.C. § 119, of German patent application No. DE 10 2017 006 898 filed Jul. 20, 2017 and DE 10 2017 009 564, filed Oct. 14, 2017; the prior applications are herewith incorporated by reference in their entireties.

BACKGROUND OF THE INVENTION

Field of the Invention

The present invention relates to a method for distributing data, in particular update program data, in a communication system according to the preamble of the in independent method claim, a communication system and a metering unit.

Data transmission from metering units, such as, for example, sensors, consumption meters or components of smart home controllers, is becoming increasingly important in everyday use. One important field of application of metering units is the use of intelligent consumption meters, also known as smart meters. These are normally consumption meters incorporated into a supply network, e.g. for energy, electricity, gas or water, which indicate actual consumption to the respective connection user and use a communication network to transmit the consumption data to the provider. Intelligent consumption meters offer the advantage that manual meter readings are no longer required and shorter-term billing can be implemented by the provider according to actual consumption. Shorter-term reading intervals in turn enable a more accurate linkage between end customer tariffs and the development of trading prices for electricity. The supply networks can also be substantially more effectively utilized.

Generic consumption meters normally transmit the accrued metering data in the form of data packets or data messages via a radio communication link, for example in the SRD (Short Range Devices) or ISM (Industrial, Scientific, Medical) frequency range, to higher-level data collectors (e.g. concentrators, a network node point or the control center of the provider). Data messages are normally made up of a plurality of data packets. The SRD or ISM frequency ranges offer the advantage that they are license-free and only a general approval of the frequency administration is required for use. However, the problem exists that interference can frequently occur due to the frequency of use of frequency ranges of this type for a wide range of technical devices, such as garage door controllers, baby monitors, alarm systems, WLAN, Bluetooth, smoke alarms or the like.

In the case of intelligent consumption meters, energy consumption, on the one hand, since the meters are usually battery-controlled and are intended to have the longest possible maintenance intervals and, on the other hand, operational reliability are of decisive importance. In order to be able to guarantee a fault-free and reliable operation of the consumption meters, occasional program updates, referred to as firmware updates, are required for the consumption meters. Firmware updates of this type normally consist of update program data which are increasingly transmitted centrally via remote maintenance, i.e., for example, via a radio communication link, to a multiplicity of consumption meters. In terms of transmission quality and transmission duration, above all the transmission of substantial program data packets via a radio communication link can be problematic, since the respective consumption meters must be successfully contacted individually and at specific times by the data collector for the program update, and legal limits exist in relation to the transmission frequency or occupancy of the frequency channels (duty cycle).

European patent EP 2 848 005 B1, corresponding to U.S. Pat. No. 9,648,400, describes a method for distributing update program data in a communication system with a data logger or data collector and a plurality of consumption meters. The update program data are divided here into data segments. The data collector in each case opens a dedicated update session for each consumption meter, i.e. a unicast session, and steadily transmits all data segments here to the respective consumption meter. The consumption meter then acknowledges receipt of all received data segments so that the data collector receives the information indicating which data segments have been received and which have not. The data collector can accordingly retransmit the remaining, not yet transmitted, data segments until all data segments have been transmitted. As soon as the consumption meter has received all data segments, the data collector opens a dedicated update session with the next consumption meter. The transmitted data segments are also receivable in each dedicated update session by the other consumption meters if these consumption meters can coincidentally receive the data segments, i.e. are in range and are then coincidentally receiving at the same frequency. Since the data collector has to open a dedicated update session for each consumption meter, i.e. a session created for this consumption meter alone, this has disadvantages in terms of time requirement and frequency occupation duration. For example, the data collector must first successfully contact each consumption meter and then transmit all data segments in a plurality of transmission steps. The associated time requirement for transmitting a plurality of data segments to a multiplicity of consumption meters is correspondingly high. A dedicated update session further entails a precisely defined transmit frequency, so that the probability of a transmission of the data segments to other consumption meters which are intended to receive outside this dedicated update session is low, since the consumption meters probably communicate via different frequency channels. The majority of the data segments are consequently transmitted via consumption-meter-specific update sessions. This results in a high frequency occupation duration and a substantial overall time requirement for the performance of the distribution of the update program data and the entire program update. The consumption meters must furthermore have longer ready-to-receive times outside their own update session in order to be able to receive any update program data from other update sessions. This in turn results in a comparatively high energy consumption.

SUMMARY OF THE INVENTION

The object of the present invention is to provide a novel method for distributing data within a communication system by which the data can be transmitted reliably, efficiently in terms of time and energy, and with a short frequency occupation duration.

The above object is achieved by the entire teaching of the independent method claim and the subsidiary claims. Appropriate designs of the invention are claimed in the subclaims.

In the method according to the invention, data, in particular update program data, are distributed in a communication system from a data collector to a group of metering units. The communication system contains a plurality of metering units, in particular consumption meters, such as, for example, electricity, water or heat quantity meters, which are provided in each case to measure the consumption of a delivered supply medium, and at least one data collector, in particular for acquiring the consumption data of the individual metering units derived from consumption. Each metering unit has a communication module and a time reference or frequency reference device for this purpose, and at least one processor or microcontroller to operate the metering unit which operates on the basis of program data or by means of the use of program data. The data are distributed within a common update session between the data collector and at least a part of the group of metering units. The data are therefore not transmitted in dedicated sessions of the data collector with individual metering units, but instead simultaneously to preferably all metering units in the group. To do this, the data are first arranged in a series of data packets, referred to as data messages. A synchronization sequence common to the group of metering units is transmitted by the data collector via a definable transmit frequency within the at least partially common distribution session. The synchronization sequence is dimensioned here in such a way that the frequency reference device of each metering unit in the group of metering units is synchronized with the transmitted synchronization sequence within a session or distribution session, in particular an update session. The synchronization of the frequency reference device can, for example, comprise the synchronization of the receive carrier frequency and the carrier frequency of the data collector or the concentrator carrier frequency, or the synchronization of the receive filter of the metering unit so that the signal bandwidth of the data collector is in the receive window of the metering unit. A frequency estimation, for example, can be performed, wherein the frequency is adjusted on the basis of the frequency error resulting therefrom, or the carrier frequency can be adjusted accordingly. The common session between the data collector and the group of metering units is furthermore configured in such a way that the data are transmitted by the data collector at defined transmit times and are received by the metering units in the group. By means of the method according to the invention, an upcoming distribution of the data by the data collector is communicated to the metering units by use of a synchronization sequence. The metering units actively search here for the synchronization sequence which has been transmitted via the transmit frequency defined, in particular, by the data collector. As a result, all metering units can initially determine the defined transmit frequency and can be synchronized on the basis of the synchronization sequence. The communication module is furthermore set accordingly in terms of transmit frequency and transmit time. It is thereby guaranteed that the data are transmitted reliably and essentially simultaneously to the communication modules. The distribution furthermore takes place time-efficiently since the data collector has to open only one session or update or distribution session for all metering units in the group, or at least considerably fewer sessions overall. The ready-to-receive times of the metering units or the communication modules during the entire distribution process are thereby substantially reduced, as a result of which energy can be saved. The required frequency occupation duration for the transmission of the entire data or update program data is accordingly substantially shorter overall.

The data are preferably update program data, e.g. of a firmware update, consumption data, synchronization data, time data or the like.

The synchronization sequence can appropriately be modified within the common session. In a preferred manner, the synchronization sequence is shortened toward the end of the session. As a result, the synchronization sequence can be shortened, e.g. following the successful synchronization, i.e. after the synchronization sequence has been received by all metering units in the group and all metering units are synchronized, in order to then carry out minor adjustments only, e.g. to the time reference or frequency reference.

In the ensuing transmissions, more data packets of the data can be transmitted accordingly in the available transmit time period or transmit volume, i.e. the ratio between the data or update program data and the synchronization sequence is increased toward the end of the session or update session.

The receive bandwidth of the metering unit is preferably in the narrowband range. According to one preferred design, the receive bandwidth of the respective metering unit is less than 25 kHz, preferably less than 20 kHz, preferably less than 5 kHz, preferably less than 3 kHz, particularly preferably less than 2 kHz. The bandwidth can preferably be defined in accordance with the ETSI EN 300 220-1 V3.1.1 standard (as at February 2017).

The ratio between the receive bandwidth of the respective metering unit and the frequency tolerance of the frequency reference device of the metering unit can appropriately be less than 1, preferably less than 0.5, particularly preferably less than 0.3.

The transmit frequency of the data collector can be determined by the respective metering unit, for example through frequency scanning and or frequency estimation.

The data are preferably transmitted here in broadcast, i.e. from one transmitter to all potential receivers, or in multicast, i.e. from one transmitter to a selected receiver group. The selection in the multicast can be made here by the data collector, e.g. on the basis of a device-specific ID number of the respective metering unit.

The method can appropriately include a synchronization of the frequency reference devices or time reference devices of the metering unit by use of the synchronization sequence.

Time information can appropriately be assigned to the synchronization sequence, wherein the communication module can determine the second transmit time on the basis of this time information. A different synchronization sequence, for example, can be used for this purpose, or the time information can be attached to the synchronization sequence as a data quantity. Further information, such as, for example, time, reference time, reference frequency, ID number, scope and type of the update program data or the like can furthermore be assigned to the synchronization sequence. The time intervals between the respective synchronization sequences can furthermore also serve to announce an upcoming transmission of the data packets or a part of the data packets.

The metering unit can furthermore generate a synchronization acknowledgement following completed synchronization and can transmit it to the data collector in order to communicate the successful synchronization of the frequency reference device of the metering unit concerned to the data collector. This offers the resulting advantage that the data collector always receives the information indicating how many metering units in the group have received the synchronization sequence and transmits the synchronization sequence accordingly as often as required until all metering units in the group have received the synchronization sequence, i.e. all metering units in the group are synchronized. Transmission reliability is again additionally increased as a result.

The second transmit time preferably contains a plurality of temporally successive transmit times at which the data collector transmits the data packets which are to be transmitted. As a result, the data packets which are to be distributed can be transmitted gradually, thus ensuring compliance with the legal restrictions in terms of the occupancy duration of the frequency bands concerned or the maximum permitted duty cycle.

Pilot synchronization sequences can appropriately be assigned to the data packets and/or to the series of data packets. The pilot synchronization sequences represent short synchronization sequences here, e.g. in the form of a preamble or beacon, containing time and or transmit frequency information on the basis of which a fine adjustment of the transmit frequency, the frequency reference device, the receive window or the like can be undertaken.

The data packets and/or the series of data packets can furthermore be transmitted in alternation with the interspersed pilot synchronization sequences so that the fine adjustment can also be carried out continuously during the data transmission. Transmission reliability is additionally increased as a result.

According to one preferred design of the present invention, the metering units can have a data memory in which the received data packets or parts of the data packets, i.e. incompletely received data packets, can be stored following reception. In practice, the data packets or parts of the data packets can be assembled in the data memory following the transmission, e.g. by the processor (combining).

The method according to the invention can further includes the following steps of:

a) generation of an acknowledgement of receipt by the metering units on the basis of the received data packets and communication of the acknowledgement of receipt by the respective communication module to the data collector;
b) performance by the data collector of a data synchronization between the acknowledgement of receipt of the communication module and the data packets to be transmitted; and
c) rearrangement of the data packets to be transmitted on the basis of the data synchronization, so that only data packets which have not yet been received by the respective communication modules are transmitted.

It is thereby guaranteed that the data collector receives a response or acknowledgement from the communication modules following the transmission of the data packets and with this acknowledgement is informed which data packets have been successfully received, whereby the data collector performs a data synchronization between the successfully received data packets and the data packets to be transmitted. The transmission status of the data packets is communicated continuously from the respective metering unit in the group to the data collector.

The metering units can appropriately complete the parts of the data packets, the data packets or the one or more series of data packets following completed reception, e.g. they can assemble or combine them into update program data. The metering units can then update their firmware or their program data, i.e. the programmable content of their processor or microcontroller, by means of the update program data.

According to a further design of the method, the data packets can be transmitted in alternation with interspersed transmit pauses. Energy is thereby saved if, for example, a communication module of a metering unit is temporarily impaired by a source of interference occurring for a limited time, whereby no transmission or dispatch takes place for the duration of one or more transmit pauses in which no communication takes place in any case between the communication module and the data collector.

Pauses can furthermore be provided between the ready-to-receive times of the respective metering unit. The overall ready-to-received time can thereby be reduced if, for example, the reception is temporarily impaired by sources of interference. The energy requirement can thereby be reduced to a particular extent.

The transmission quality of the respective frequencies within a specific frequency range can appropriately be determined by the data collector and the selection of the transmit frequency can be defined on the basis of the determined transmission quality. The transmission quality can be determined, for example, via an interference source detection based, for example, on a signal-to-noise ratio determination or a signal power measurement on the respective transmit frequency. The transmit frequency can thereby be defined in such a way that a frequency is selected which has the highest possible transmission quality.

The metering unit preferably adjusts the receive frequency at least three times, preferably at least five times, particularly preferably at least ten times for the reception of the synchronization sequence.

In addition, the data can also be distributed in unicast at different frequencies, e.g. the data collector can conduct an additional dedicated session with at least one metering unit in the group of metering units if this metering unit has not received the data or was unable to receive the data completely via the common broadcast session. The additional unicast data sessions are preferably conducted here at different frequencies so that the frequency is adaptable to the transmission situation of the respective metering unit.

Synchronization sequences can also be appropriately transmitted in unicast. However, this involves very short synchronization sequences. The common synchronization sequence can furthermore be dimensioned within the common session of the group of metering units in such a way that it is at least three times, preferably at least ten times, particularly preferably at least twenty times as long as a synchronization sequence in unicast.

The synchronization sequence can furthermore be transmitted in one piece, i.e. without a pause. As a result, the probability of reception of the synchronization sequence by the metering unit is increased to a particular extent.

The present invention secondarily also claims a communication system in which the data are preferably distributed according to the method according to the invention, having a plurality of metering units, in particular consumption meters, which are arranged in each case to measure the consumption of a delivered supply medium, and a data collector, e.g. to acquire and forward consumption data derived from consumption and/or to distribute update program data. Here, each metering unit comprises a communication module and a frequency reference device, and also a processor, microcontroller or the like to operate the metering unit on the basis of program data or by means of the use of program data. The metering units and the data collector are arranged in a communication network. The data collector is configured here to transmit the data, such as, for example, update program data, at a transmit frequency via the communication system within a session or update session common to the group of metering units. A synchronization sequence common to the metering units is appropriately transmitted by the data collector within the common session. The synchronization sequence is dimensioned in such a way that the frequency reference devices of each metering unit in the group of metering units can be synchronized within a session or update session with the transmitted synchronization sequence, i.e. it is selected as long enough in relation to the respective tolerances of the frequency reference devices (crystal error).

The present invention furthermore also claims a metering unit, in particular a consumption meter, which is configured to receive and/or transmit the data preferably by means of the method according to the invention. To do this, the metering unit contains a communication module, a frequency reference device and preferably a processor to operate the metering unit on the basis of program data or by means of the use of program data. Here, the metering unit can receive a synchronization sequence transmitted by a transmitter, such as, for example, the data collector, via a receive frequency. The metering unit is operated in such a way that it adjusts the receive frequency at least three times, preferably at least five times, particularly preferably at least ten times for the reception of the synchronization sequence, wherein the adjustment of the receive frequency can be made e.g. via the frequency reference device and/or the communication module. The data are preferably transmitted or dispatched and/or received here in broadcast and/or multicast.

Other features which are considered as characteristic for the invention are set forth in the appended claims.

Although the invention is illustrated and described herein as embodied in a method for distributing data, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
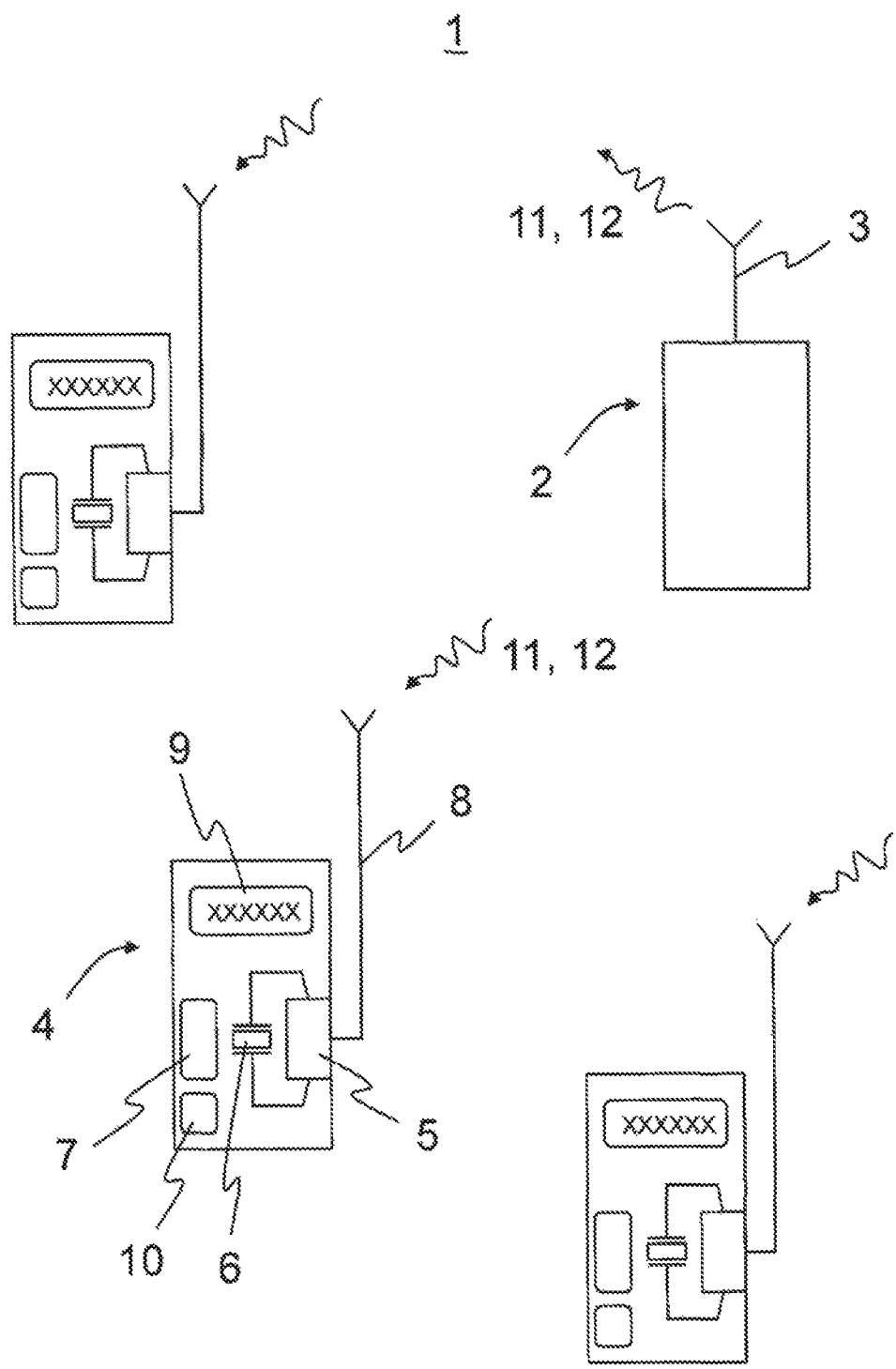
FIG. 1 is a substantially simplified schematic view of a plurality of consumption meters which communicate with a data collector in each case by a communication module.

Referring now to the figures of the drawings in detail and first, particularly to FIG. 1 thereof, there is shown a communication system according to the invention. The communication system 1 has a data collector 2 with an antenna 3 for transmitting and receiving data and/or signals, and also a plurality of metering units or consumption meters 4, such as, for example, gas, water or electricity meters which are provided to record the individual consumption of a supply medium by a consumer. Each consumption meter 4 has a communication module 5 which can transmit and receive data and/or signals via an antenna 8. Each consumption meter 4 further has a time and/or frequency reference device 6 which can predefine a clock timing, e.g. for time determination, e.g. by means of a crystal oscillator (clock crystal, HF crystal or the like). Each consumption meter 4 can appropriately comprise a display 9 which serves to indicate the current meter status, as a result of which a manual reading of the meter status can be carried out.

The consumption meters 4 communicate the current meter status in the form of consumption data to the data collector 2 at preferably defined reference times. The data are transmitted here via a radio communication link, in particular via the ISM or SRD frequency ranges, preferably between 863 MHz and 870 MHz. These frequency ranges offer the advantage that they are usable license-free, but have the disadvantage that they may be occupied to a limited extent only due to legal restrictions. A limitation of the duty cycle or frequency occupancy duration therefore applies.

Each consumption meter 4 further contains a processor 10 which serves to control the consumption meter 4. The processor 10 operates on the basis of an operating program or firmware which must be updated from time to time for bug fixing or for retrofitting new functions. Operating programs of this type are updated via update program data which are installed either manually on the consumption meter 4 or through remote maintenance via a radio communication link. The installation of the update program data via a radio communication link offers the advantage that no access by maintenance personnel to the consumption meter 4 is necessary.

Figure 3:
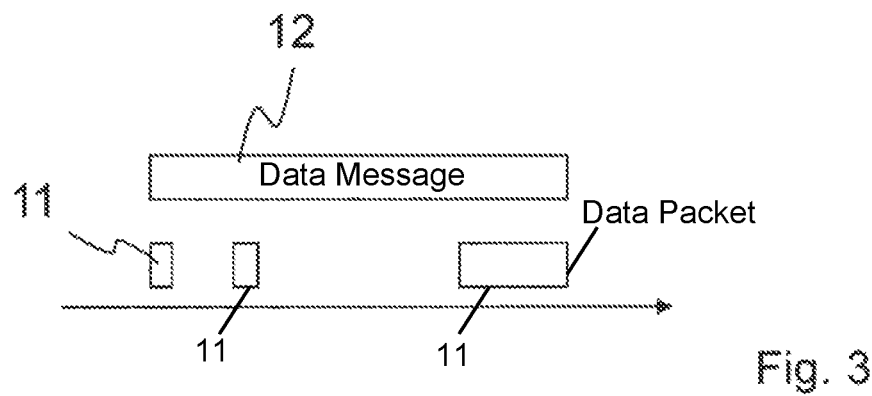
FIG. 3 is a simplified schematic view of a data message consisting of a series of data packets.

As shown in simplified form in FIG. 3, the data or update program data are first arranged in data packets 11 or series of data packets 11, referred to as data messages 12, by the data collector 2 and are then distributed via the communication network of the communication system 1. The consumption meters 4 can receive the data packets 11 or the data messages 12 by the communication module 5 and the antenna 8 and can store them temporarily in a data memory 7 until the update procedure or beyond.

Figure 2:
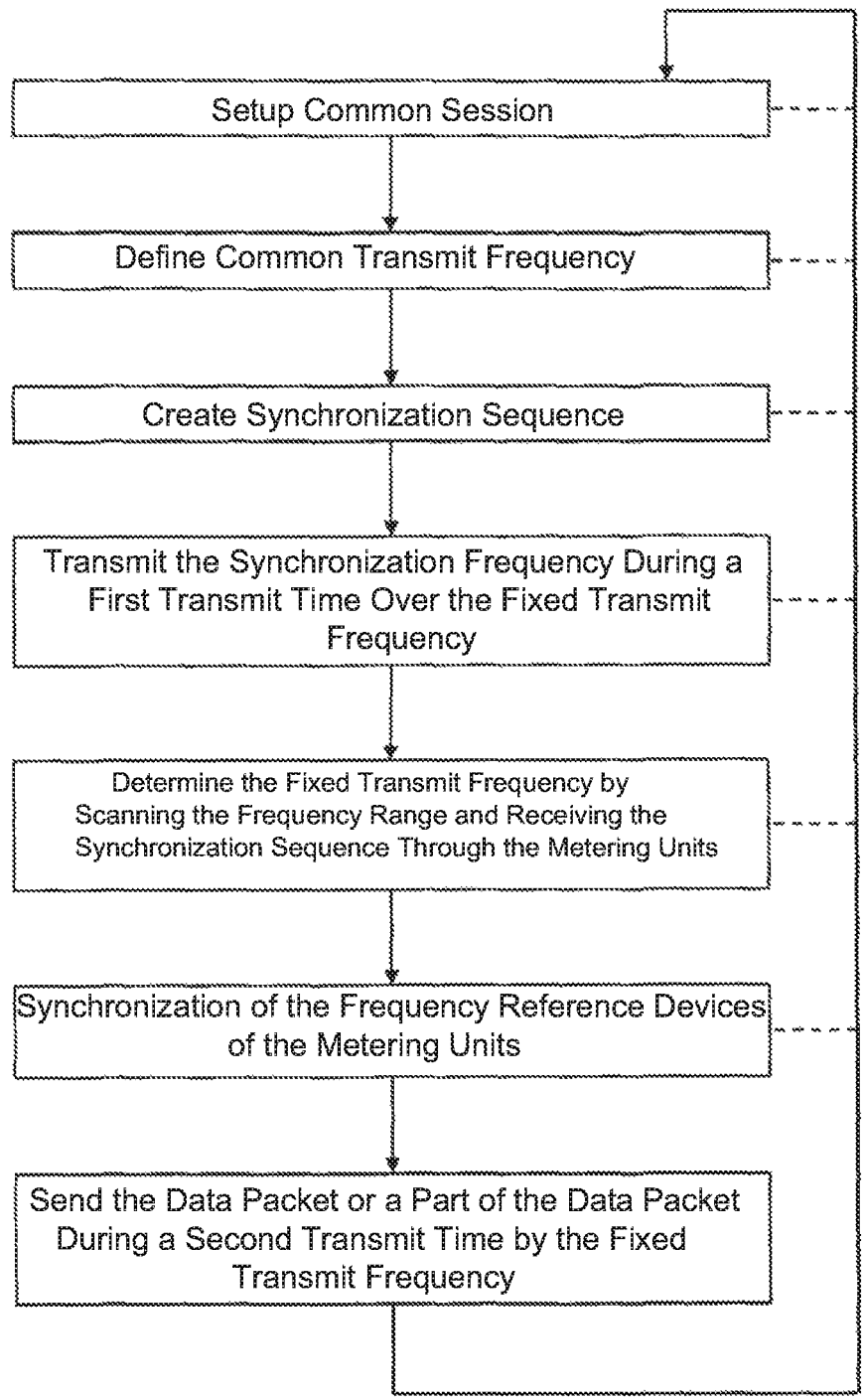
FIG. 2 is a flow diagram of a method according to the invention.
Figure 4:
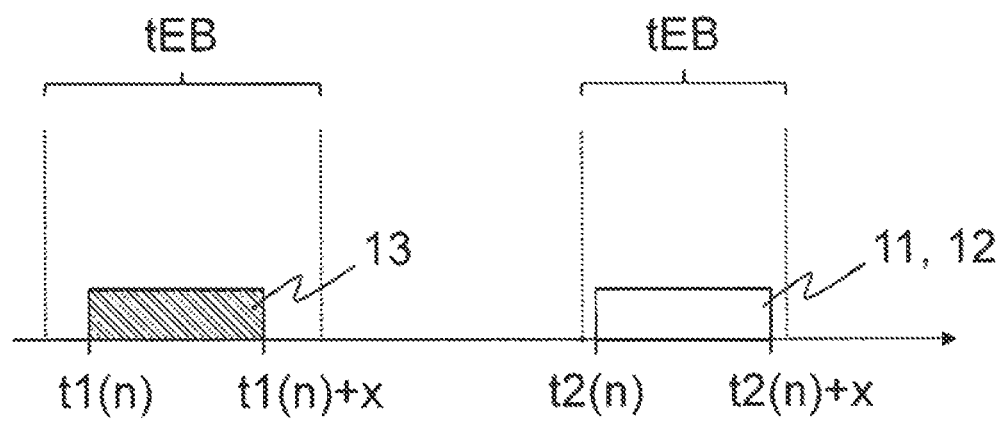
FIG. 4 is a first graph of the temporal sequence of the method according to the invention.

A temporal sequence of one design of the method for distributing data is shown schematically in FIG. 2. The data collector 2 appropriately first sets up a common session or update session between the data collector 2 and a group of consumption meters 4. The data or update program data are transmitted here by the data collector 2 at defined transmit times and are received by the consumption meters 4 in the group. For this purpose, a common transmit frequency is first defined by the data collector 2, wherein the data collector 2 can preferably first determine the transmission quality of the frequencies within a specific frequency range, e.g. the SRD or ISM frequency band range. The transmit frequency can then be defined by the data collector 2 on the basis of the determined transmission qualities. The data collector 2 appropriately creates a synchronization sequence 13 which the data collector 2 transmits via the defined transmit frequency at a predefined first transmit time $t1(n)$. The transmission preferably takes place by means of broadcast or multicast transmission. In particular, all communication modules 5 of the respective consumption meters 4 are intended to be ready-to-receive here at the time of the transmission of the data collector 2. According to FIG. 4, the ready-to-receive time period tEB should be greater than the transmit time period of the data collector 2 which begins at the first transmit time $t1(n)$ and ends after a time period x, e.g. x=6 minutes. The ready-to-receive time period tEB of the consumption meters 4 is greater here than the intended transmit time of the data collector 2, so that a ready-to-receive state of the communication modules 5 at the corresponding transmit times of the data collector 2 can still be guaranteed, even if clock deviations of the frequency reference devices 6 occur.

The data collector 2 preferably uses the maximum legally possible relative frequency occupancy duration to transmit the synchronization sequence 13 in order to reach as many consumption meters 4 as possible. The relative frequency occupancy duration is, for example, less than 10% in the frequency range from 869.65 to 869.70 MHz. The data collector 2 can accordingly transmit for approximately six minutes within a one-hour time period. Within these six minutes, the communication modules 5 can determine the defined transmit frequency of the data collector 2 by gradually scanning the frequency range. Here, the communication modules 5 remain ready to receive on one frequency for a specific time period, e.g. a few seconds, and then change to the next frequency. The communication module 5 of the respective consumption meter 4 can determine the defined transmit frequency of the data collector 2 on the basis of the reception of the synchronization sequence 13 of the data collector 2 at a specific frequency. The consumption meter 4 or the frequency reference device 6 of the consumption meter 4 can be synchronized by means of the information (e.g. frequency reference, time reference, ID number, time and/or transmit time) contained in the synchronization sequence 13.

Following the synchronization of the frequency reference devices 6 of the consumption meters 4 in the group, preferably all consumption meters 4 in the group, the data packets 11 or a part of the data packets 11 are transmitted by the data collector 2 via the defined transmit frequency at a second transmit time $t2(n)$. The ready-to-receive time period tEB of the communication modules 5 at the second transmit time $t2(n)$ can be substantially closer to the transmit time period of the data packets 11 between $t2(n)$ and $t2(n)+x$, since the frequency reference devices 6 of the consumption meters 4 have previously been synchronized by the synchronization sequence 13 and a deviation of the frequency reference devices 6 can only be correspondingly small.

Figure 5:
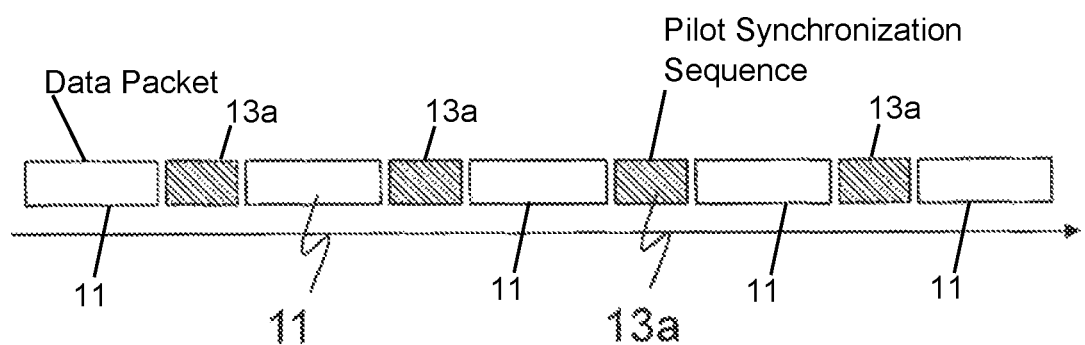
FIG. 5 is a simplified schematic view of the temporal sequence of a transmission of data packets which are transmitted in alternation with interspersed pilot synchronization sequences.

The synchronization sequence 13 can alternatively contain a type of countdown, so that the consumption meters 4, with the reception of the synchronization sequence 13, receive the information indicating when the second transmit time $t2(n)$ begins. This can be done e.g. via different synchronization words. Alternatively or additionally, the consumption meter 4 can also use pilot synchronization sequences 13a which, according to FIG. 5, are transmitted between the data packets 11 or the data messages 12 in alternation therewith. The pilot synchronization sequences 13a serve here to adjust the frequency slightly if necessary between the data transmissions, i.e. to perform a fine adjustment during the data transmission.

Figure 6:
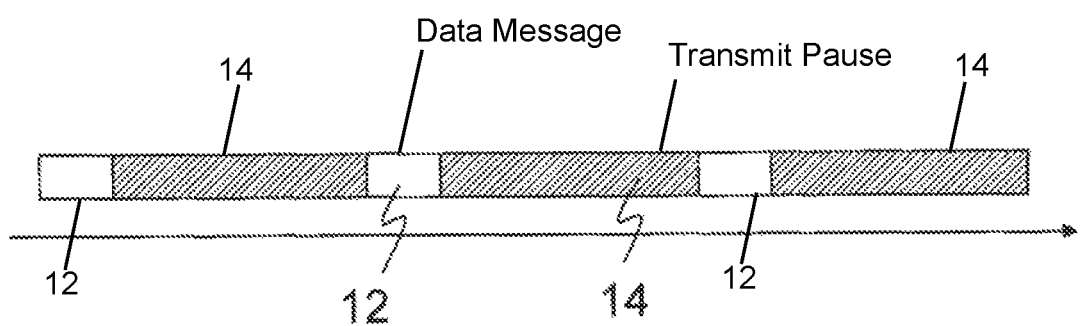
FIG. 6 is a simplified schematic view of the temporal sequence of a transmission of data packets which are transmitted in alternation with interspersed transmit pauses.

Alternatively or additionally, according to FIG. 6, transmit pauses 14 can also be provided between the data transmissions. As a result, energy can be saved in the case where a persistent source of interference blocks the transmit frequency. Unnecessary data transmissions which would not reach the communication module 5 due to the source of interference can thus be avoided. According to one preferred design of the method according to the invention, all method steps up until the transmission of the data packets by the data collector 2 can be carried out multiple times in succession before the data packets 11 are transmitted by the data collector 2 at the second transmit time $t2(n)$. The second transmit time $t2(n)$ can similarly comprise a plurality of consecutive transmit times n at which data packets 11 or data messages 12 are transmitted. Above all the transmission of the synchronization sequence 13 by the data collector 2 at the first transmit time $t1(n)$ via the defined transmit frequency and the determination of this defined transmit frequency by each of the communication modules 5, and also the subsequent synchronization of the respective frequency reference devices 6 of the metering units are carried out multiple times before the data packets 11 are transmitted by the data collector 2.

The communication modules 5 of the consumption meters 4 can furthermore generate acknowledgements, e.g. in the form of data packets or a beacon, and can transmit them via the communication network to the data collector 2. The communication module 5 can, for example, generate a synchronization acknowledgement SB following the completed reception of the synchronization sequence 13 and/or following the completed synchronization and can transmit said synchronization acknowledgement to the data collector 2 in order to acknowledge the synchronization of the frequency reference device 6 to the data collector 2.

The method can furthermore preferably comprise the generation of an acknowledgement of receipt EB which serves to communicate the information to the data collector 2 indicating which data packets 11 have been received by the respective communication module 5. The acknowledgement of receipt EB can be generated here by the communication module 5 on the basis of the received data packets 11. The data collector 2 can then perform a data synchronization with the data packets 11 to be transmitted using the information relating to the received data packets 11 contained in the acknowledgement of receipt EB. By means of this data synchronization, the data collector 2 can determine the data packets 11 which are still missing and accordingly rearrange the data packets 11 to be transmitted so that only data packets 11 which have not yet been received by the respective communication modules are transmitted.

Figure 7:
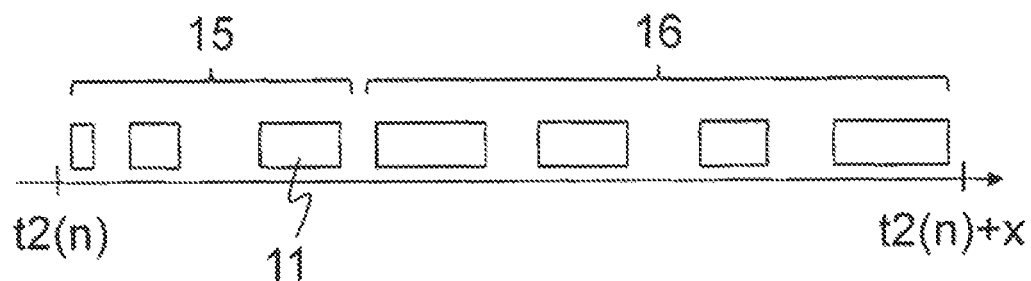
FIG. 7 is a simplified schematic view of the temporal sequence of a transmission of a series of data packets which comprises missing and new data packets.

The transmission of the data packets 11 by the data collector 2 and the generation of the acknowledgement of receipt EB by the consumption meters 4, the performance of the data synchronization by the data collector 2 and also the rearrangement by the data collector 2 of the data packets 11 to be transmitted can preferably be repeated here as often as required until all data have been completely received by the respective communication modules 5. According to FIG. 7, a data transmission of the data collector 2 can be designed accordingly in such a way that it is composed of missing data packets 15 and new data packets 16.

Figure 8:
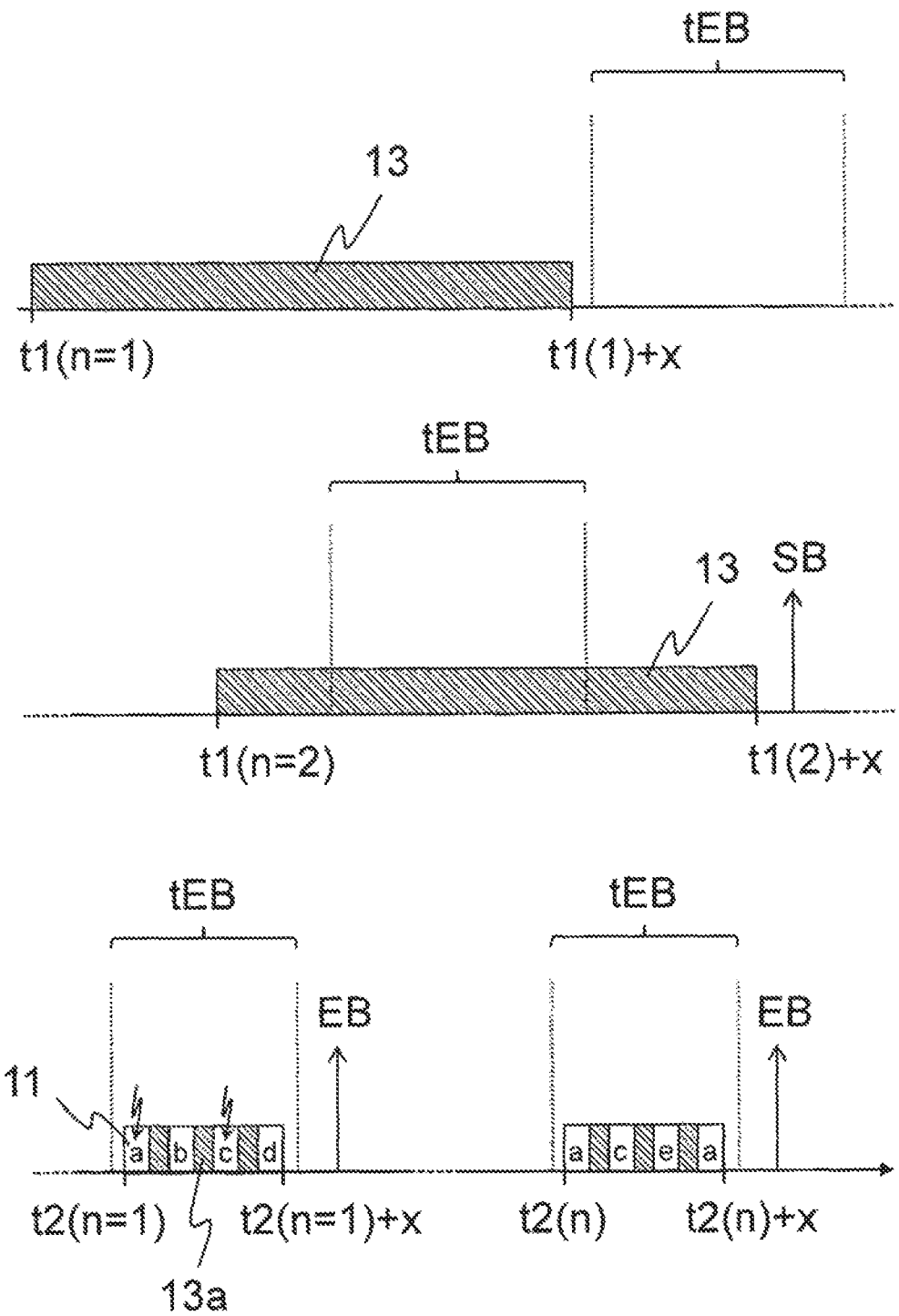
FIG. 8 is a second graph showing the temporal sequence of the method according to the invention.

FIG. 8 shows a further design of the temporal sequence of the method according to the invention between a consumption meter 4 from the group of metering units and the data collector 2. A synchronization sequence 13 is first transmitted at the first transmit time t1($n$) via the defined transmit frequency from the data collector 2 at a transmit time n=1 until the transmit time t(n=1)+x. This synchronization sequence 13 is not received by the communication module 5 of the consumption meter 4 in this transmit time period t1($n$=1) to t1($n$=1)+x, since the ready-to-receive window tEB lies outside the transmit time period of the synchronization sequence 13. The communication module 5 accordingly communicates no synchronization acknowledgement SB to the data collector 2. For this reason, the data collector 2 attempts to transmit the synchronization sequence at further transmit times n of the first transmit time t1($n$). This continues until the communication module 5 of the consumption meter 4 has received the synchronization sequence 13, as shown in FIG. 8, in the transmit time period t1($n$=2) to t1($n$=2)+x, has performed a synchronization and has acknowledged this with the generation and transmission of the synchronization acknowledgement SB to the data collector 2. The data collector 2 consequently ceases the transmission of the synchronization sequence 13 and continues with the transmission of the data packets 11 at the next possible transmit time period, the second transmit time t2($n$). Here, the data collector 2 first transmits the data packets 11 (a, b, c, d) in alternation with pilot synchronization sequences 13a via the defined transmit frequency at the transmit time n=1. Following the transmit time period t2($n$=1) to t2($n$=1)+x, the consumption meter 4 generates an acknowledgement of receipt EB and transmits it to the data collector 2 via the defined transmit frequency.

As shown in FIG. 8, the reception of two data packets 11 (a, c) is affected by interference, whereas two data packets 11 (b, d) have been received without interference. The acknowledgement of receipt EB of the consumption meter 4 consequently contains the information indicating that two data packets 11 (b, d) have been completely received. The data collector 2 can accordingly rearrange the data packets 11 still to be transmitted so that it can transmit the missing data packets 11 (a, c) and also a new data packet 11 (e) via the defined transmit frequency at a following transmit time n.

The data collector 2 can furthermore also use the transmit time period according to the legal restriction relating to the duty cycle in order to repeatedly transmit the data packets 11 to be transmitted, as shown in FIG. 8 with reference to the data packet 11 (a). Following the transmission of the data packets 11 (a, c, e) and the reception of these data packets 11 (a, c, e), the consumption meter 4 again generates an acknowledgement of receipt EB which contains the information indicating that the data packets 11 (a, c, e) or (a-e) have been successfully received, and transmits this via the defined transmit frequency to the data collector 2.

The individual data packets 11 can be stored here in the data memory 7 of the consumption meter 4 so that the data packets 11 can also be transmitted over a plurality of hours or a plurality of days or weeks. Each consumption meter 4 can complete and/or combine the data packets 11 or the series of data packets 11 following completed reception. As soon as the data are combined, the program update, for example, can be carried out by the respective consumption meter 4 on the basis of the data or update program data. The consumption meter 4 can then communicate the successfully performed program update to the data collector 2 via an acknowledgement.

Figure 11:
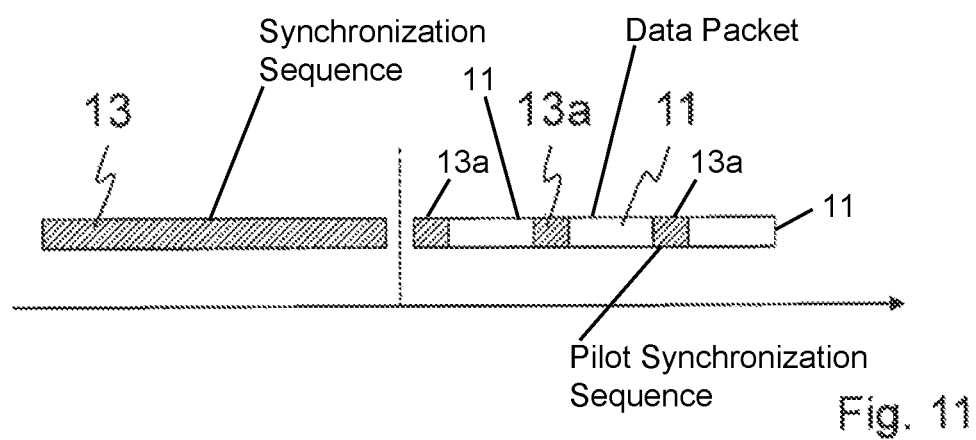
FIG. 11 is a simplified schematic view of the temporal sequence of the synchronization sequence and the transmission of data packets which are transmitted with interspersed pilot synchronization sequences.

According to FIG. 11, the data can be transmitted in the form of data packets 11 following the reception of the synchronization sequence 13 and therefore following completed synchronization (shown in FIG. 11 by the broken line). The data packets 11 are preferably transmitted here in broadcast or multicast via the corresponding transmit frequency with interspersed pilot synchronization sequences 13a which are provided for continuous synchronization during the data transmission. The pilot synchronization sequences 13a are similarly transmitted here in broadcast or multicast. However, these synchronization sequences are similar in length to synchronization sequences which are conventionally transmitted in unicast. The synchronization sequence 13 is significantly longer in comparison, preferably at least three times, preferably at least ten times, particularly preferably at least twenty times as long as a synchronization sequence of a unicast transmission.

Figure 9:
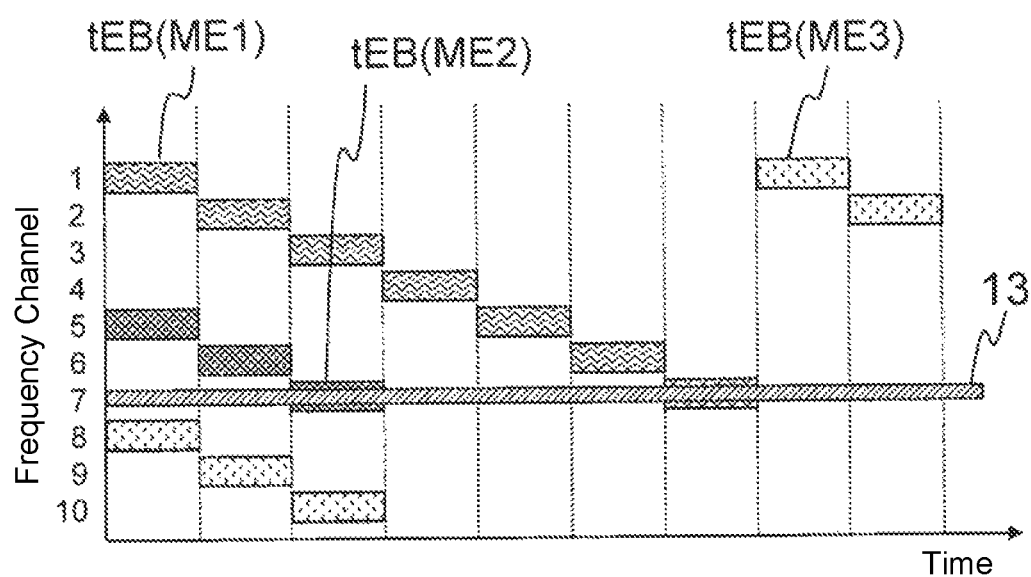
FIG. 9 is a simplified schematic view of a search sequence in which three metering units scan different frequency channels for the reception of the synchronization sequence.

FIG. 9 shows a search sequence of three metering units ME1, ME2, M3 which search on different frequencies or frequency channels (as shown in FIG. 9 with reference to frequency channel 1-10) or scan the frequency channels for the synchronization sequence 13 to determine the transmit frequency. According to FIG. 9, the synchronization sequence 13 is transmitted from the data collector 2 via the frequency channel 7 to the metering units ME1, ME2, ME3, i.e. in particular in broadcast or multicast. The transmit time period of the synchronization sequence 13 is known to the metering units ME1, ME2, ME3. As a result, the latter are ready to receive in the agreed time period, i.e. the metering units search at this time for the synchronization sequence 13 on different channels, e.g. by means of frequency scanning and/or frequency estimation. For this purpose, the data collector 2 transmits within the common session a synchronization sequence 13 common to the metering units ME1, ME2, ME3, the duration of which is dimensioned in such a way that the frequency device 6 of each metering unit in the group is synchronized within the distribution session with the transmitted synchronization sequence 13.

The metering units begin the search on a specific or randomly chosen frequency channel (e.g. ME1 on frequency channel 1, ME2 on frequency channel 5 and ME3 on frequency channel 8), i.e. they are ready to receive on this frequency channel for a specific time period. If they do not receive the synchronization sequence 13 on this frequency channel, they change to the next frequency channel. The metering unit ME2, for example, receives the synchronization sequence 13 on frequency channel 7 after the third adjustment of the frequency channel. The frequency channel can be adjusted here by the metering unit randomly, pseudo-randomly or according to a definable system (e.g. through incrementation of the frequency channels). The sampling of the frequency channels can furthermore begin again following an unsuccessful search, as shown with reference to ME3 in FIG. 9, e.g. if the highest frequency channel has been reached in an incrementation of the frequency channels.

The receiver or metering unit has a specific receive bandwidth here in which it can receive the synchronization sequence 13. The entire receive bandwidth may, for example, be 2 kHz, so that the metering unit, with e.g. 100 frequency channels and a synchronization sequence 13 with a duration of 2 s, can provide a receive window of approximately 20 ms per frequency channel, i.e. the time period of the ready-to-receive-state of the metering unit is 20 ms per frequency channel. The transmit frequency is determined here e.g. by the gradual scanning of the frequency channels. In practice, the search sequence can be ended following the reception of the synchronization sequence 13 or can be restarted following an unsuccessful pass. The metering unit can consequently determine the frequency channel of the synchronization sequence 13, i.e. the transmit frequency, at best during the first receive window, i.e. in the first 20 ms of the search sequence.

Figure 10:
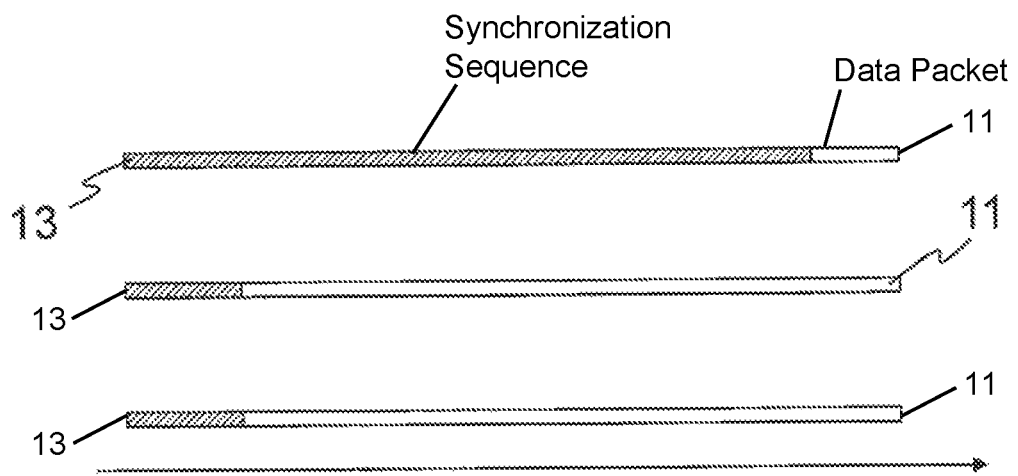
FIG. 10 is a simplified schematic view of three consecutive transmissions of the synchronization sequence and data packets.

The synchronization sequence 13 can appropriately be modified within the common session or update session. As shown in FIG. 10, it can be shortened toward the end of the session so that a synchronization of the metering units is first performed or is given priority at the beginning of the session. On completion of the synchronization, which is indicated e.g. by the reception of the synchronization acknowledgement SB, the proportion of data can then be increased in a transmit time period in order to transmit said data more quickly. As a result, the ratio between the data and the synchronization sequence 13 can be modified within the session so that more data are transmitted toward the end of the session, preceded, followed and/or interspersed by short synchronization sequences.

The ratio between the receive bandwidth of the respective metering unit and the frequency tolerance of the frequency reference device 6 furthermore plays an important part. The frequency tolerance is determinable here by the product of the transmit frequency and the crystal error (of the frequency reference device 6). For example, for a frequency reference device 6 with a 10 ppm crystal error (e.g. with a TCX oscillator) and a transmit frequency of 868 MHz, this gives a frequency tolerance of approximately 8.6 kHz (8.6 kHz=868.000 kHz*10*$10^{-6}$). However, a very narrow receive bandwidth is required for an adequately high transmission quality. In known methods, this causes transmission problems, since the frequency tolerance is normally a multiple of the receive bandwidth here for a successful transmission.

The receive bandwidth of the metering unit is preferably in the narrowband range, e.g. less than 25 kHz, preferably less than 20 kHz, preferably less than 5 kHz, preferably less than 3 kHz, particularly preferably less than 2 kHz. In the method according to the invention, the ratio between the receive bandwidth of the respective metering unit and the frequency tolerance of the frequency reference device 6 of the metering unit is preferably less than 1, preferably less than 0.5 and particularly preferably less than 0.3. For a receive bandwidth of e.g. 1 kHz and a frequency tolerance of 4.3 kHz, this accordingly gives a ratio between the receive bandwidth and the frequency tolerance of 0.23. The bandwidth can be determined, for example, in accordance with the ETSI EN 300 220-1V 3.1.1 standard (as at February 2017).

Conversely, the ratio between the receive bandwidth and the frequency tolerance in known methods is normally approximately 12 (e.g. 12 kHz receive bandwidth to 1 kHz frequency tolerance, with a 5 ppm crystal and a transmit frequency of 169 MHz). However, it has surprisingly become evident that a successful session or update session can nevertheless be conducted in "narrowband broadcast" or "narrowband multicast" using the method according to the invention, so that the present method represents, inter alia, a quite considerable contribution in this area.

Individual feature combinations (secondary combinations) and possible combinations of individual features of different embodiments not shown in the drawing figures are also expressly encompassed by the disclosure content.

REFERENCE NUMBER LIST

1 Communication system
2 Data collector
3 Antenna
4 Consumption meter
5 Communication module
6 Frequency reference device
7 Data memory
8 Antenna
9 Display
10 Processor
11 Data packet
12 Data message
13 Synchronization sequence
13a Pilot synchronization sequence
14 Transmit pause
15 Missing data packets
16 New data packets
EB Acknowledgement of receipt
SB Synchronization acknowledgement
tEB Ready-to-receive time period (metering unit)
t1(n) First transmit time
t2(n) Second transmit time
n Transmit time

The invention claimed is:

1. A method for distributing data in a communication system having a group of metering units disposed in each case to measure a consumption of a delivered supply medium, and a data collector, wherein each metering unit having a communication module, a frequency reference device, and at least one processor to operate the metering unit, wherein the metering units and the data collector are disposed in a communication network, which comprises the steps of:
   transmitting the data by the data collector at a transmit frequency via the communication system within a common session common to the group of metering units;
   transmitting a synchronization sequence common to the metering units within the common session and the synchronization sequence is dimensioned and/or varied in such a way that the frequency reference device of each of the metering units in the group of metering units is synchronized with the synchronization sequence transmitted within the common session; and
   receiving the data at the metering units, wherein a receive bandwidth of the metering units being in a narrowband range, wherein a ratio between the receive bandwidth of the metering unit and a frequency tolerance of the frequency reference device of said metering unit being less than 1.

2. The method according to claim 1, wherein the data are update program data, consumption data, synchronization data, or time data.

3. The method according to claim 1, wherein the synchronization sequence is modified within the common session.

4. The method according to claim 1, which further comprises transmitting the data and the synchronization sequence in data packets and a ratio between the data and the synchronization sequence is modified within the common session.

5. The method according to claim 4, which further comprises assigning pilot synchronization sequences to the data packets and/or a series of data packets.

6. The method according to claim 5, wherein the data packets and/or the series of data packets are transmitted in alternation with interspersed said pilot synchronization sequences.

7. The method according to claim 4, which further comprises transmitting the data packets or a series of the data packets in alternation with interspersed transmit pauses.

8. The method according to claim 1, which further comprises determining the transmit frequency of the data collector by the metering unit through frequency scanning and/or frequency estimation.

9. The method according to claim 1, wherein the data are distributed in a broadcast or a multicast.

10. The method according to claim 1, which further comprises performing synchronization of the frequency reference device of each of the metering units by means of the synchronization sequence.

11. The method according to claim 1, which further comprises assigning time information to the synchronization sequence and the communication module can determine a second transmit time on the basis of the time information.

12. The method according to claim 11, wherein the second transmit time has a plurality of temporally successive transmit times n at which the data collector transmits data packets which are to be transmitted.

13. The method according to claim 1, wherein on completion of synchronization, the metering unit generates a synchronization acknowledgement and transmits it to the data collector in order to acknowledge the synchronization of the frequency reference device to the data collector.

14. The method according to claim 1, wherein the synchronization sequence is dimensioned in such a way that it is at least three times as long as the synchronization sequence in unicast.

15. The method according to claim 1, which further comprises transmitting the synchronization sequence in one piece.

16. The method according to claim 1, wherein the metering units have a data memory and received data packets or parts of the received data packets are stored in the data memory.

17. The method according to claim 16, wherein once reception is completed, the metering units complete parts of the data packets and/or the data packets or combine them into the data.

18. The method according to claim 1, which further comprises:
generating an acknowledgement of receipt by the metering units on a basis of received data packets and communication of the acknowledgement of receipt by the communication module to the data collector;
performing by the data collector a data synchronization between the acknowledgement of receipt of the communication module and data packets to be transmitted; and
rearranging the data packets to be transmitted on a basis of data synchronization, so that only the data packets which have not yet been received by the communication modules are transmitted.

19. The method according to claim 1, wherein the data are additionally distributed on different frequencies in unicast.

20. The method according to claim 1, wherein receive pauses are provided between the ready-to-receive times of the metering unit.

21. The method according to claim 1, which further comprises determining a transmission quality of frequencies within a specific frequency range via the data collector and the transmit frequency is defined on a basis of transmission qualities.

22. A method for distributing data in a communication system having a group of metering units disposed in each case to measure a consumption of a delivered supply medium, and a data collector, wherein each metering unit having a communication module, a frequency reference device, and at least one processor to operate the metering unit, wherein the metering units and the data collector are disposed in a communication network, which comprises the steps of:
transmitting the data by the data collector at a transmit frequency via the communication system within a common session common to the group of metering units; and
transmitting a synchronization sequence common to the metering units within the common session and the synchronization sequence is dimensioned and/or varied in such a way that the frequency reference device of each of the metering units in the group of metering units is synchronized with the synchronization sequence transmitted within the common session, wherein the metering unit adjusting a receive frequency at least three times for a reception of the synchronization sequence.

23. A method for distributing data in a communication system having a group of metering units disposed in each case to measure a consumption of a delivered supply medium, and a data collector, wherein each metering unit having a communication module, a frequency reference device, and at least one processor to operate the metering unit, wherein the metering units and the data collector are disposed in a communication network, which comprises the steps of:
transmitting the data by the data collector at a transmit frequency via the communication system within a common session common to the group of metering units;
transmitting a synchronization sequence common to the metering units within the common session and the synchronization sequence is dimensioned and/or varied in such a way that the frequency reference device of each of the metering units in the group of metering units is synchronized with the synchronization sequence transmitted within the common session; and
receiving the data at the metering units, wherein a receive bandwidth of the metering units is in a narrowband range, wherein the receive bandwidth of the metering unit is less than 25 kHz.

24. A communication system for distributing data, the communication system comprising:
a group of metering units which are disposed in each case to measure consumption of a delivered supply medium;
a data collector;
each of said metering units having a communication module, a frequency reference device, a processor to operate said metering units on a basis of program data or by means of a use of the program data, and a receive bandwidth in a narrowband range, wherein a ratio between the receive bandwidth of said metering unit and a frequency tolerance of said frequency reference device of said metering unit is less than 1; and said data collector is configured to transmit the program data at a transmit frequency via the communication system within a common session common to the group of metering units, wherein a synchronization sequence common to said measuring units is transmitted by said data collector within the common session, and the synchronization sequence is dimensioned in such a way that said frequency reference device of each of said metering units in said group of metering units is synchronized with the synchronization sequence transmitted within the common session.

25. A metering unit which can receive and transmit data, the metering unit, comprising:

a communication module;

a frequency reference device;

a processor to operate the metering unit on a basis of program data or by means of a use of the program data, wherein the metering unit is configured to receive a synchronization sequence transmitted by a transmitter via a receive frequency; and the metering unit is operated in such a way that it adjusts the receive frequency for receiving the synchronization sequence at least three times.

* * * * *